US010398124B2

(12) United States Patent
Do

(10) Patent No.: US 10,398,124 B2
(45) Date of Patent: Sep. 3, 2019

(54) CAT LITTER PROCESS

(71) Applicant: David Do, Oak Hill, FL (US)

(72) Inventor: David Do, Oak Hill, FL (US)

(*) Notice: Subject to any disclaimer, the term of this patent is extended or adjusted under 35 U.S.C. 154(b) by 0 days.

(21) Appl. No.: 16/038,636

(22) Filed: Jul. 18, 2018

(65) Prior Publication Data
US 2019/0059316 A1 Feb. 28, 2019

Related U.S. Application Data

(62) Division of application No. 15/687,655, filed on Aug. 28, 2017.

(51) Int. Cl.
| | | |
|---|---|---|
| *A01K 1/01* | (2006.01) | |
| *B02C 18/22* | (2006.01) | |
| *B02C 18/12* | (2006.01) | |
| *A01K 1/015* | (2006.01) | |

(52) U.S. Cl.
CPC ........... *A01K 1/0121* (2013.01); *A01K 1/011* (2013.01); *A01K 1/0155* (2013.01); *B02C 18/12* (2013.01); *B02C 18/2216* (2013.01)

(58) Field of Classification Search
USPC ............. 119/161, 162, 165, 168, 171, 172; D30/161; 4/445, 446, 420.3, 245.3, 420, 4/442, 441; D23/296
See application file for complete search history.

(56) References Cited

U.S. PATENT DOCUMENTS

| | | | | |
|---|---|---|---|---|
| 3,601,093 A | * | 8/1971 | Cohen ................. | A01K 1/0121 119/162 |
| 3,603,290 A | * | 9/1971 | O'Rork ............... | A01K 1/0121 119/162 |
| 3,656,457 A | * | 4/1972 | Houston ............. | A01K 1/0121 119/162 |
| 4,123,489 A | | 10/1978 | Kelley | |
| RE30,424 E | * | 11/1980 | Heldenbrand ....... | A01K 1/0107 119/170 |
| 4,231,321 A | * | 11/1980 | Cohen ................. | A01K 1/0121 119/162 |
| 4,570,573 A | | 2/1986 | Lohman | |
| 5,216,979 A | | 6/1993 | Sallee et al. | |
| 5,335,379 A | * | 8/1994 | Waldo ................... | A47K 17/00 4/231 |
| 6,014,946 A | | 1/2000 | Rymer | |
| 6,119,629 A | | 9/2000 | Sicchio | |
| 8,051,804 B1 | | 11/2011 | Rescate | |
| 2011/0185976 A1 | * | 8/2011 | Egy ....................... | A01K 29/00 119/162 |
| 2014/0190420 A1 | * | 7/2014 | Ito ........................ | A01K 1/0155 119/172 |
| 2017/0035021 A1 | | 2/2017 | Wang et al. | |
| 2017/0049071 A1 | | 2/2017 | Brown | |

FOREIGN PATENT DOCUMENTS

JP 2017077448 A * 4/2017 ............... A47K 7/08

* cited by examiner

*Primary Examiner* — Andrea M Valenti
(74) *Attorney, Agent, or Firm* — William M. Hobby, III

(57) ABSTRACT

This invention is for a method for making and using cat litter from conventional toilet paper and using the cat litter in a toilet bowl mounted cat litter box. The cat litter box has an opening and closing door activated by a handle for discharging soiled cat litter directly into the toilet bowl for disposal. The handle also blocks the toilet from closing when the cat litter box is attached to the toilet bowl.

4 Claims, 3 Drawing Sheets

FIG. 2
FIG. 3
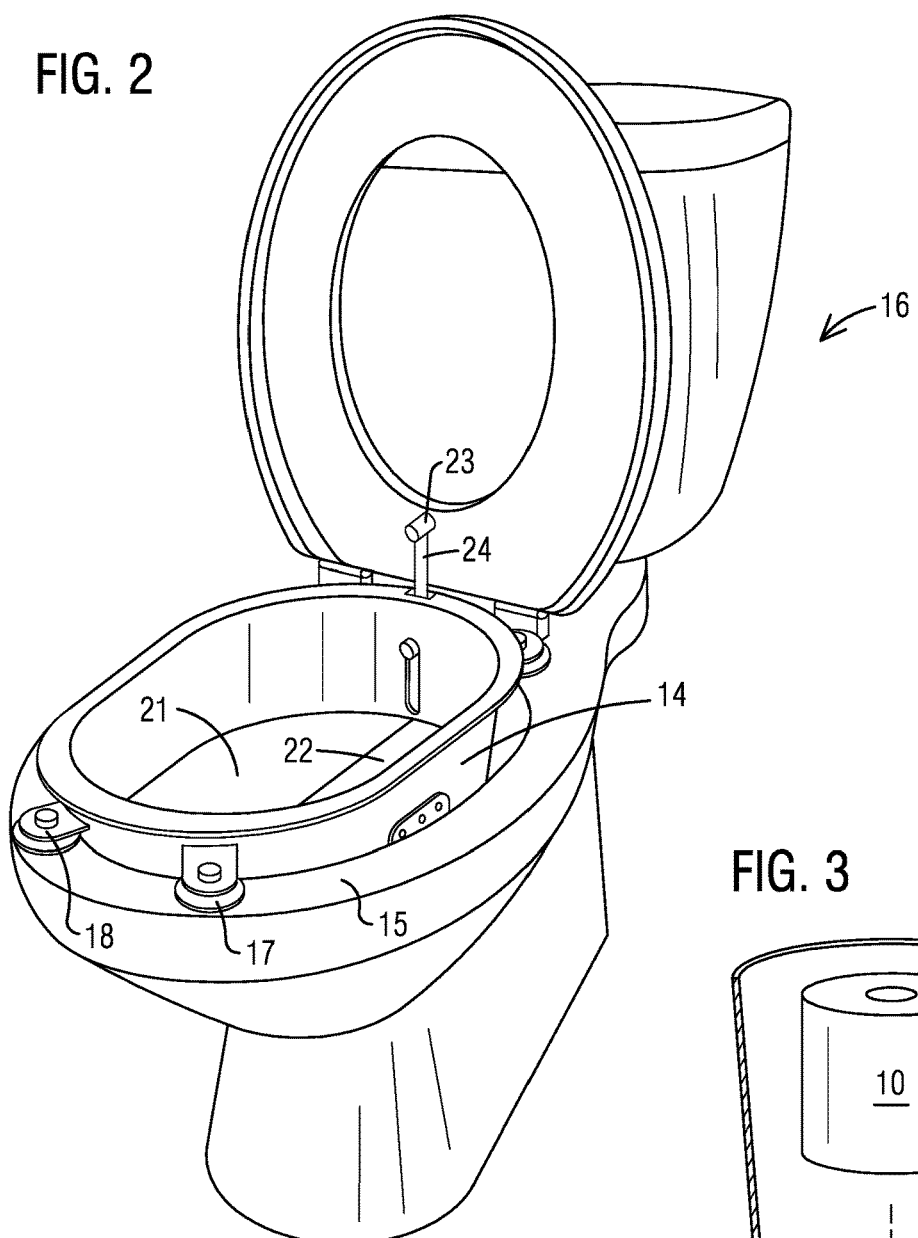
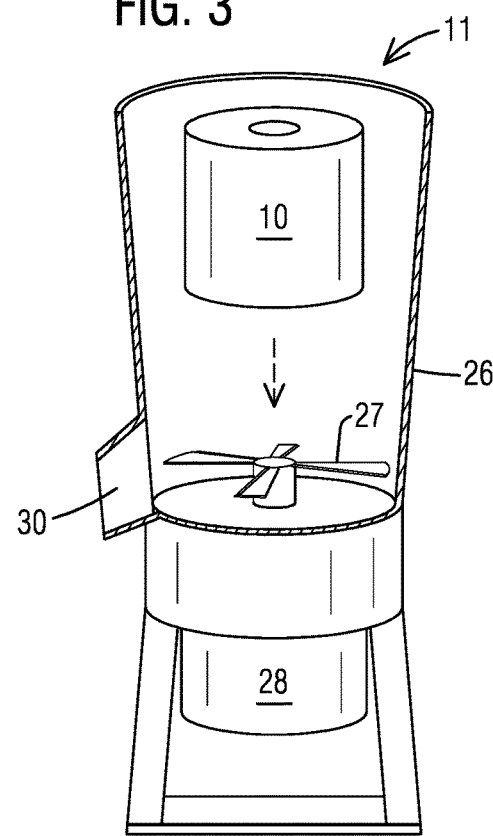

CAT LITTER PROCESS

This is a division of patent application Ser. No. 15/687,655, filed Aug. 28, 2017.

FIELD OF THE INVENTION

This invention relates to a process for making and using cat litter and especially a process of making toilet disposable cat litter for a cat litter box mountable onto a toilet bowl which cat litter box has means to discharge the cat litter into the toilet bowl for disposal.

BACKGROUND OF THE INVENTION

Odor is one of the major concerns of indoor cat owners since a small animal is capable of emitting a really foul smell. Humans have trained house cats to use a litter box filled with litter for use by the cat for their urine and feces. Cat litters enable the house cat to use their natural instinct to dig and bury their waste deposits. Litter boxes must be kept clean to prevent the cat disliking and not using the box. Thus litter boxes are typically placed for easy litter disposable which may be near a toilet when using a toilet disposable litter but most litter should not be disposed of in the toilet and into a sewer line and must be collected in a bag for disposable with the house trash and into a landfill.

Cat litter is commonly made with such materials clay, corn, wheat, safflower seeds, recycled newspaper, pine, walnut shells and other materials that will decompose in a landfill within a reasonable length of time. A composition useful as cat litter may be seen in U.S. Pat. No. 4,570,573 to Lohman for a composition useful as a cat litter, plant mulch or grease and oil absorbent. Gypsum and water are formed into pellets. The Wang et al. U.S. Patent Application Publication No. 2017/0035021 is for animal litter and process for preparing animal litter and method of removal of animal waste which includes using corn cob, a lubricant and a cohesiveness agent. A method of converting waste paper products into useful forms may be seen in the U.S. Pat. No. 4,123,489 to Kelley.

Cat litter boxes come in a wide variety of shapes including litter boxes that are mountable over a toilet bowl which use toilet disposable cat litter positioned for easy disposal. Toilet bowl mountable cat litter boxes may be seen in the Sallee et al. U.S. Pat. No. 5,216,979 for a toilet bowl mountable trap door cat litter box. In the U.S. patent to Sicchio, U.S. Pat. No. 6,119,629, a cat litter box is configured for attachment to the inside surface of a toilet bowl and has a removable tray slidably inserted through an opening in the front. The Rymer U.S. Pat. No. 6,014,946 is for a multiple use commode assembly for use as a household toilet for both humans and animals while the Rescate U.S. Pat. No. 8,051,804 is for a toilet training device for pets which is mounted to a toilet bowl. The Brown U.S. Patent Application Publication No. 2017/0049071 is for a flushable cat litter in a litter box designed to allow a majority of the cat urine to drain into a compartment separate from the cat feces and cat litter.

The present invention is for a process for making and using cat litter made from conventional toilet paper. The process includes making the disposable toilet paper cat litter for a cat litter box removably mounted onto a toilet bowl which cat litter box has means to discharge the soiled cat litter into the toilet bowl for disposal.

SUMMARY OF THE INVENTION

This invention relates to a method of for making and using cat litter from conventional toilet paper and using the cat litter in a toilet bowl mounted cat litter box. A toilet paper granulator is selected for granulating a roll of toilet paper into granules sized for use as cat litter. A cat litter box is selected which is sized to fit over a toilet bowl and has at least one hinged door in the bottom thereof and having a handle for opening and closing the door to release the contents thereof. The granules of granulated toilet paper from the toilet paper granulator are placed into the cat litter box which is removably mounted onto a toilet bowl. The cat litter box bottom door is then opened to discharge the cat litter granules therein into the toilet bowl for disposal once the cat litter has been soiled by a cat. Disposable cat litter is thus made from toilet paper, and disposed in a toilet once it has been soiled.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings:

FIG. 2 is the cat litter box of the present invention mounted to a toilet;

FIG. 3 is a cut-a-way perspective view of the open rotor knife granulator of the present invention receiving a roll of toilet paper;

DETAILED DESCRIPTION OF AN EXEMPLARY EMBODIMENT

The present invention is for a process for making, using and disposing of cat litter. Biodegradable disposable cat litter is made from conventional toilet paper for a cat litter box mountable onto a toilet bowl. The cat litter box has bottom discharge doors for discharging used cat litter into the toilet bowl for disposal.

Figure 1:
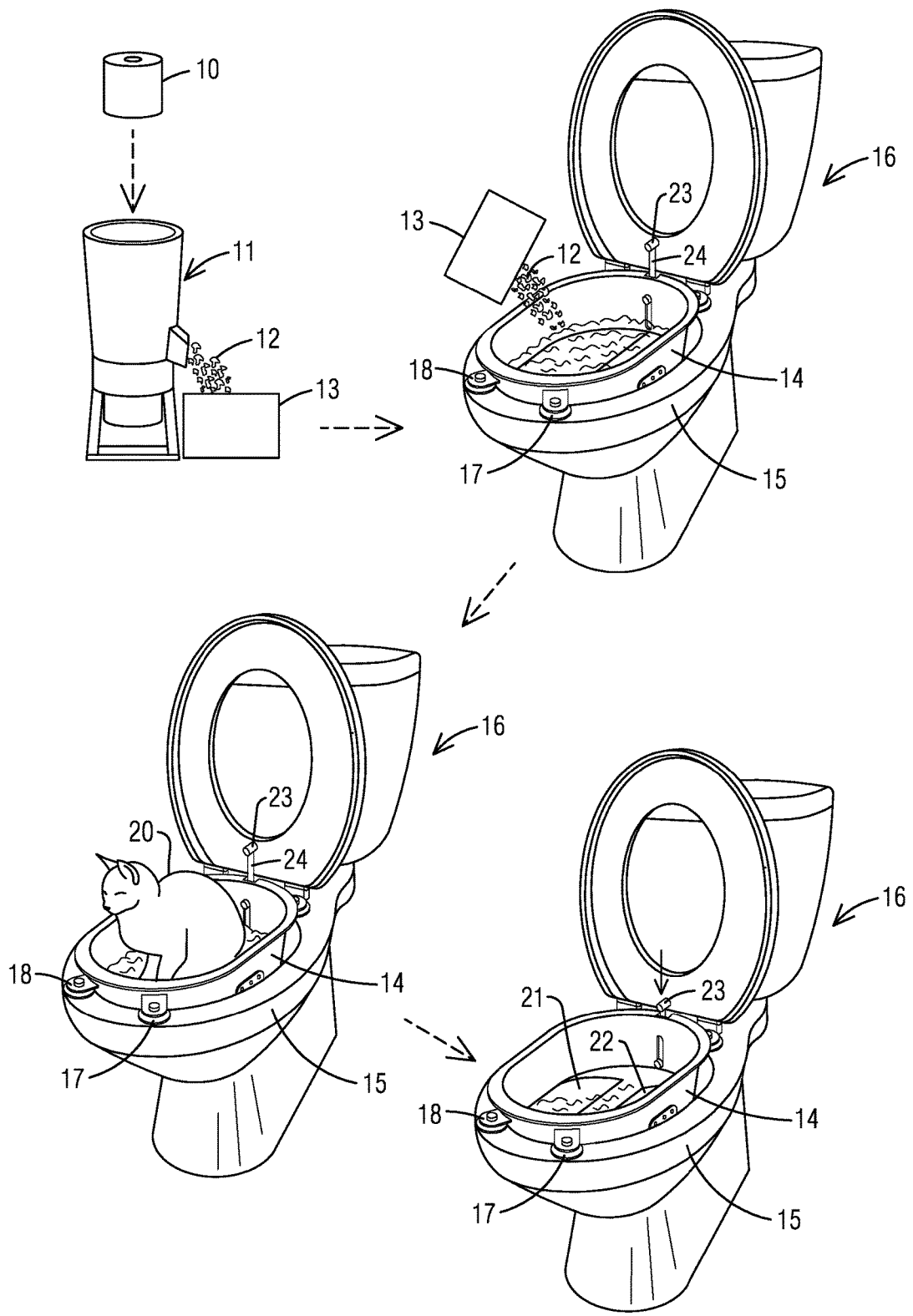
FIG. 1 is a diagrammatic flow diagram of the process for making and using cat litter in accordance with the present invention.

Referring to the drawings, FIGS. 1 through 5 and especially to FIG. 1, the process for making using and disposing of cat litter is shown in which a roll of toilet paper 10 is shown being loaded into a granulator 11 which granulates the toilet paper into granules sized for use as cat litter to produce a disposable cat litter 12 being discharged into a container 13. The cat litter in the container 13 is dumped into a cat litter box 14 mounted to a toilet bowl 15 of a toilet 16. The cat litter box is removably attached to the toilet bowl with a plurality of suction cups, each attached to a protruding flange 18 extending from the side of the cat litter box 14 in a predetermined position for maintaining the cat litter box in a position for a cat to gain easy access. The cat litter box 14 has a pair of bottom litter discharging doors 21 and 22 which are opened and closed by raising or lowering the handle 23 to push or lift the rod 24.

In operation, a roll of toilet paper 10 is dropped into the granulator 11 which generates granules of cat litter 12 which is poured into the cat litter box 14 mounted on a toilet 16 bowl 15. The cat 20 can then use the cat litter box 14 with the cat litter 12 therein and the soiled cat litter can then be discharged into the toilet bowl 15 by depressing the handle 23 to open the bottom discharge doors 21 and 22 to discharge the used cat litter into the toilet where it can be flushed down the toilet.

Turning to FIG. 2, the cat litter box 14 is illustrated in more detail mounted in the toilet bowl 15 and having the suctions cups 17, each attached to a flange 18. The cat litter box 14 has the bottom discharge doors 21 and 22 in a closed position with the handle 23 and rod 24 in a raised position. The raised handle 23 also will prevent the closing of the toilet seat 25 onto the cat.

FIG. 3 is a cut away view of the open rotor knife granulator 11 having a roll of toilet paper 10 being loaded into the granulator. The granulator has a housing 26 having rotatable blades 27 therein mounted to an electrical motor 28. The granulated toilet paper is discharged from a discharge chute 30.

Figure 4:
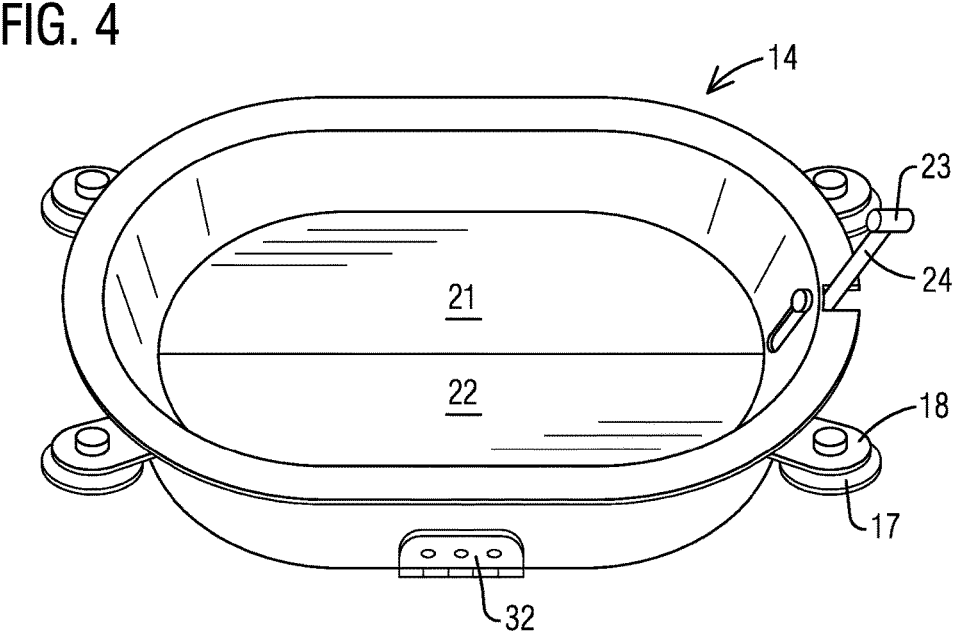
FIG. 4 is a top perspective view of the cat litter box of the present invention having the discharge doors closed.
Figure 5:
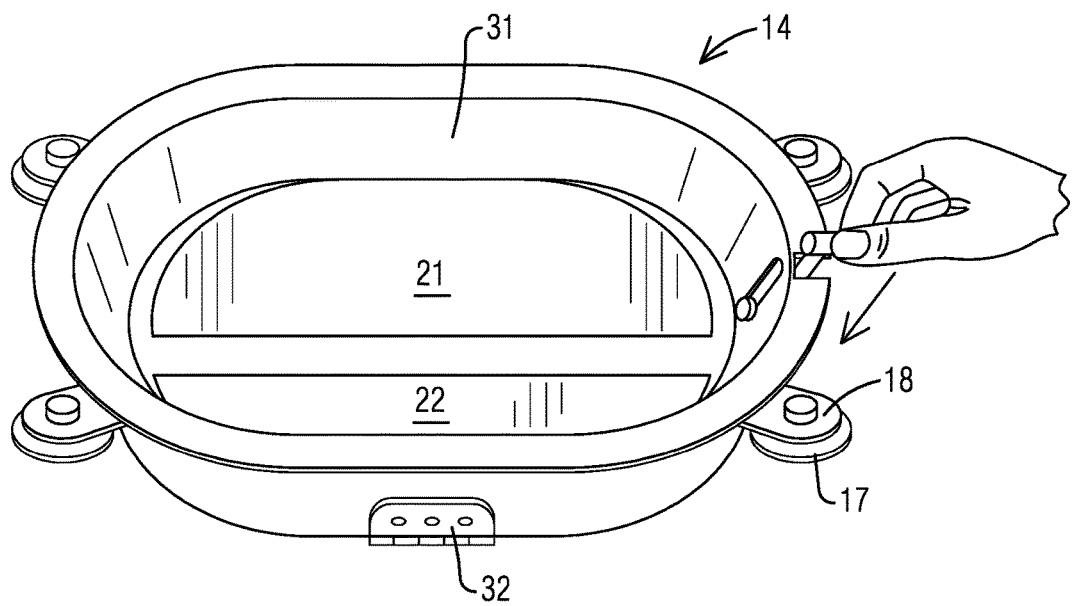
FIG. 5 is a top perspective view of the cat litter box of the present invention having the discharge doors partially opened.

The cat litter box 14 is more clearly illustrated in FIGS. 4 and 5 having side walls 31 and bottom discharge doors 21 and 22. The doors 21 and 22 are shown in a closed position in FIG. 4 and being opened in FIG. 5. The handle 23 and rod 24 are in a raised position in FIG. 4 with the doors 21 and 22 closed and are being depressed in FIG. 5 to open the doors for the discharge of the cat litter. The doors 21 and 22 are hinged to the litter box side 31 with hinges 32. The side wall 31 has a plurality of extending flanges 18 fixedly attached thereto, each one supporting a suction cup 17. The suction cups 17 are positioned for removably attaching the litter box 14 to the toilet bowl 15 of a toilet 16.

It should be clear at this time that a method and apparatus for making and using toilet disposable cat litter or the like has been provided. However the present invention is not to be considered limited to the forms shown which are to be considered illustrative rather than restrictive.

I claim:

1. A process for making and using cat litter comprising:
    selecting an open rotor knife mill toilet paper granulator for granulating a roll of toilet paper into granules;
    granulating a roll of toilet paper into granules sized for use as cat litter;
    selecting a cat litter box sized to fit over a toilet bowl having a raised toilet seat, said cat litter box having at least one hinged door in the bottom thereof having a handle for opening and closing said hinged door to release the contents of said litter box, said handle extending in a generally vertical direction adjacent said raised toilet seat preventing the lowering of said toilet seat when said cat litter box is attached to said toilet bowl, said cat litter box handle opening said at least one bottom door upon sliding said handle downwardly and closing said at least one door upon the raising of said handle and said cat litter box having a plurality of flanges protruding from the side thereof positioned to sit on the rim of a toilet bowl with each cat litter box flange having a suction cup mounted thereon for removably attaching said cat litter box to the rim of a toilet bowl;
    placing the granules of granulated toilet paper from said toilet paper granulator into said selected cat litter box;
    removably mounting said cat litter box onto a toilet bowl; and
    opening said cat litter box bottom door to discharge said cat litter granules therein into said toilet bowl for disposal once said cat litter has been soiled;
    whereby disposable cat litter can be made from toilet paper and once soiled, disposed directly into a toilet bowl.

2. The process for making and using cat litter in accordance with claim 1 in which said cat litter box has a pair of bottom doors actuated by said handle to open and close both doors simultaneously.

3. The process for making and using cat litter in accordance with claim 2 in which said cat litter box has four flanges protruding from the side thereof positioned to sit on the rim of a toilet bowl.

4. The process for making and using cat litter in accordance with claim 3 in which each cat litter box flange protruding from the side thereof has a suction cup mounted thereon for removably attaching said cat litter box to the rim of a toilet bowl.

* * * * *